No. 692,328. Patented Feb. 4, 1902.
A. MUSCIACCO.
APPARATUS FOR DELIVERING EQUAL QUANTITIES OF LIQUID.
(Application filed June 24, 1901.)
(No Model.) 7 Sheets—Sheet 1.

No. 692,328. Patented Feb. 4, 1902.
A. MUSCIACCO.
APPARATUS FOR DELIVERING EQUAL QUANTITIES OF LIQUID.
(Application filed June 24, 1901.)
(No Model.) 7 Sheets—Sheet 4.

No. 692,328. Patented Feb. 4, 1902.
A. MUSCIACCO.
APPARATUS FOR DELIVERING EQUAL QUANTITIES OF LIQUID.
(Application filed June 24, 1901.)
(No Model.) 7 Sheets—Sheet 5.

No. 692,328. Patented Feb. 4, 1902.
A. MUSCIACCO.
APPARATUS FOR DELIVERING EQUAL QUANTITIES OF LIQUID.
(Application filed June 24, 1901.)
(No Model.) 7 Sheets—Sheet 6.

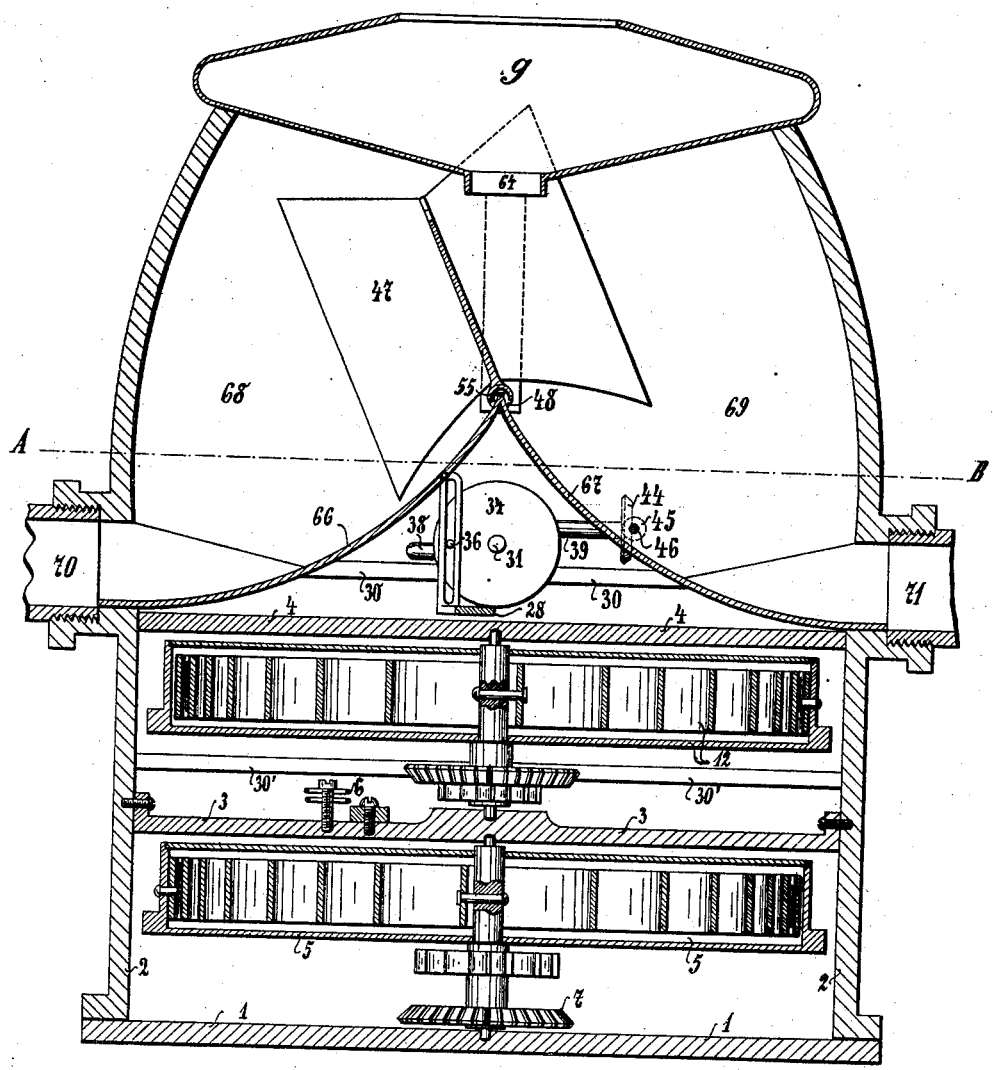

UNITED STATES PATENT OFFICE.

AUGUSTO MUSCIACCO, OF BERLIN, GERMANY.

APPARATUS FOR DELIVERING EQUAL QUANTITIES OF LIQUID.

SPECIFICATION forming part of Letters Patent No. 692,328, dated February 4, 1902.

Application filed June 24, 1901. Serial No. 65,897. (No model.)

*To all whom it may concern:*

Be it known that I, AUGUSTO MUSCIACCO, a subject of the King of Italy, and a resident of 18 Belle-Alliancestrasse, Berlin, in the Province of Brandenburg, Germany, have invented new and useful Improvements in Apparatus for Delivering Equal Quantities of Liquid; and I do hereby declare the following to be a full, clear, and exact description of the invention, such as will enable others skilled in the art to which it appertains to make and use same, reference being had to the accompanying drawings and the letters and figures of reference of this specification.

This invention relates to apparatus by means of which it is possible to divide a constant and continuous supply of a liquid automatically into any desired number of equal quantities.

The apparatus driven by means of clockwork is placed underneath the liquid-outlet, so that the liquid to be divided enters the apparatus through an opening at the top. Underneath this opening is located the distributer, which comprises a vertical but movable wall that can be inclined either toward the right or the left at equal intervals of time. This distributer can be inclined to various extents, and as it remains constantly in contact with the liquid the latter is divided into equal quantities, of which each flows in a separate direction. The movements of the distributer are controlled by means of a central clockwork mechanism. The discharge of any predetermined quantity is indicated by means of a bell, which also indicates the commencement of the next quantity. The quantities supplied are registered automatically on a dial, so that this apparatus renders the measuring of liquids quite unnecessary.

An example of apparatus according to the present invention is shown in the accompanying drawings, in which—

Figure 1:
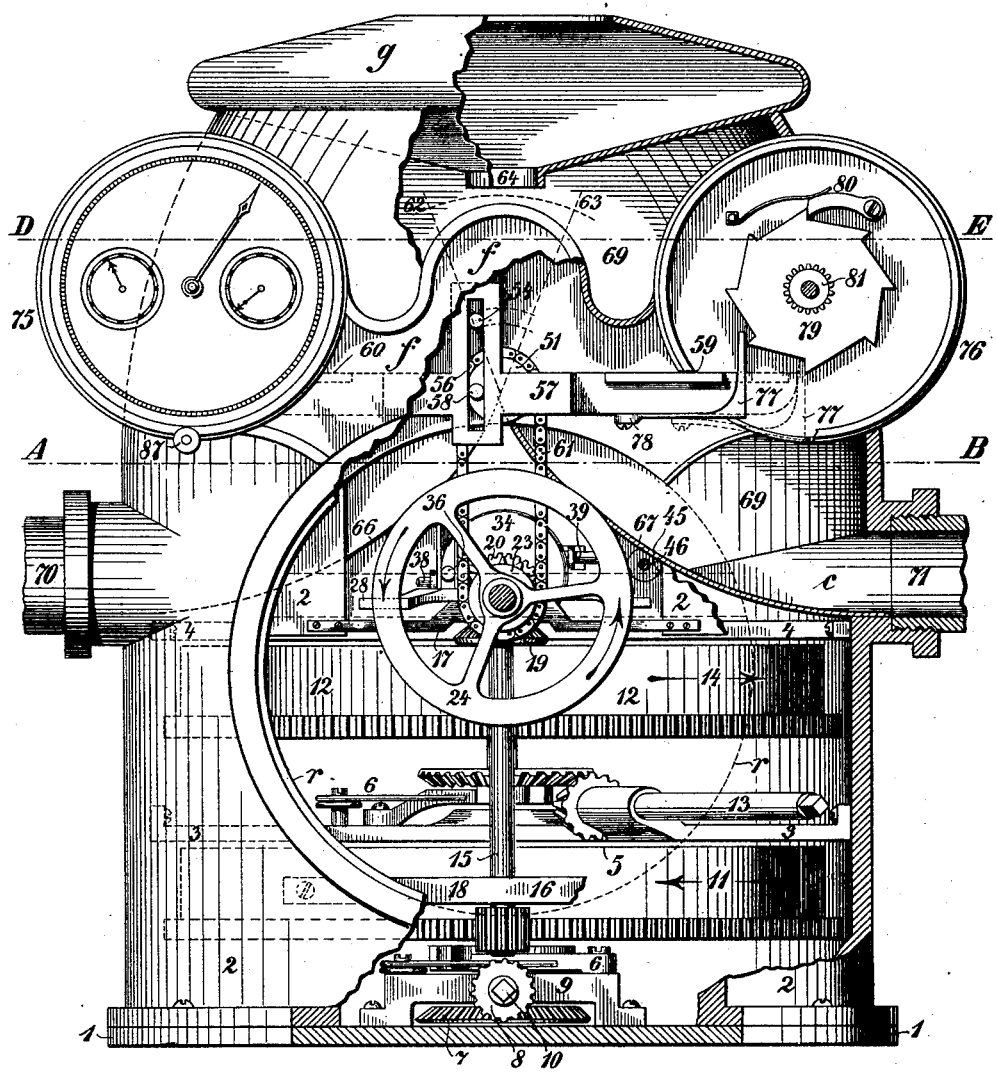
Figure 2:
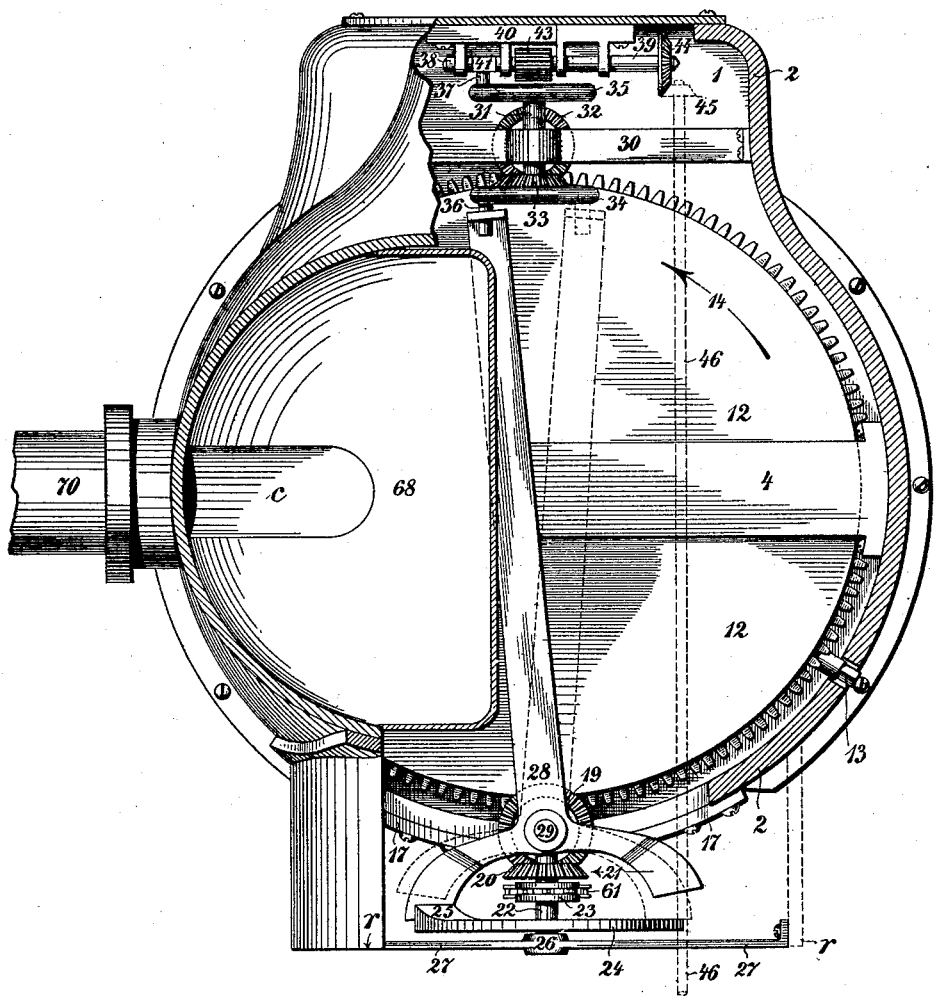
Figure 3:
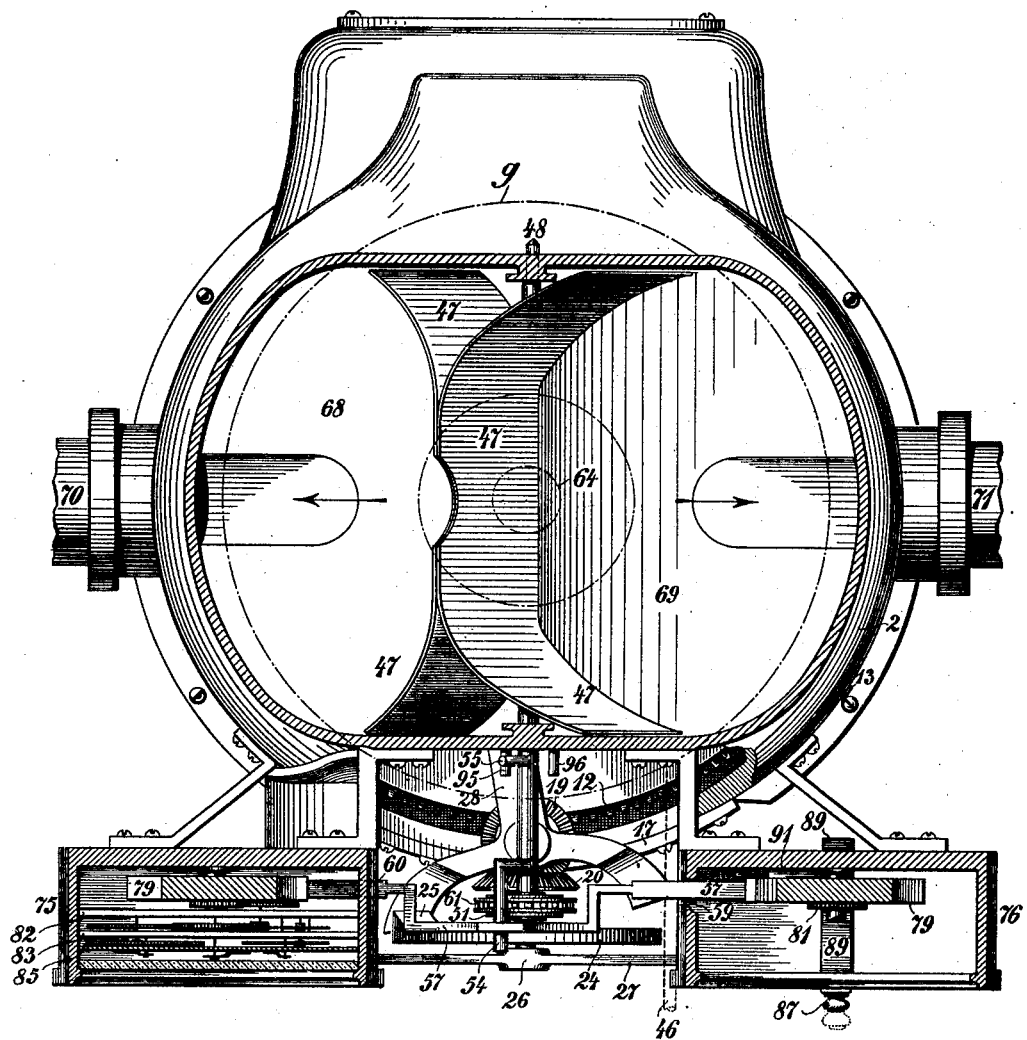
Figure 11:
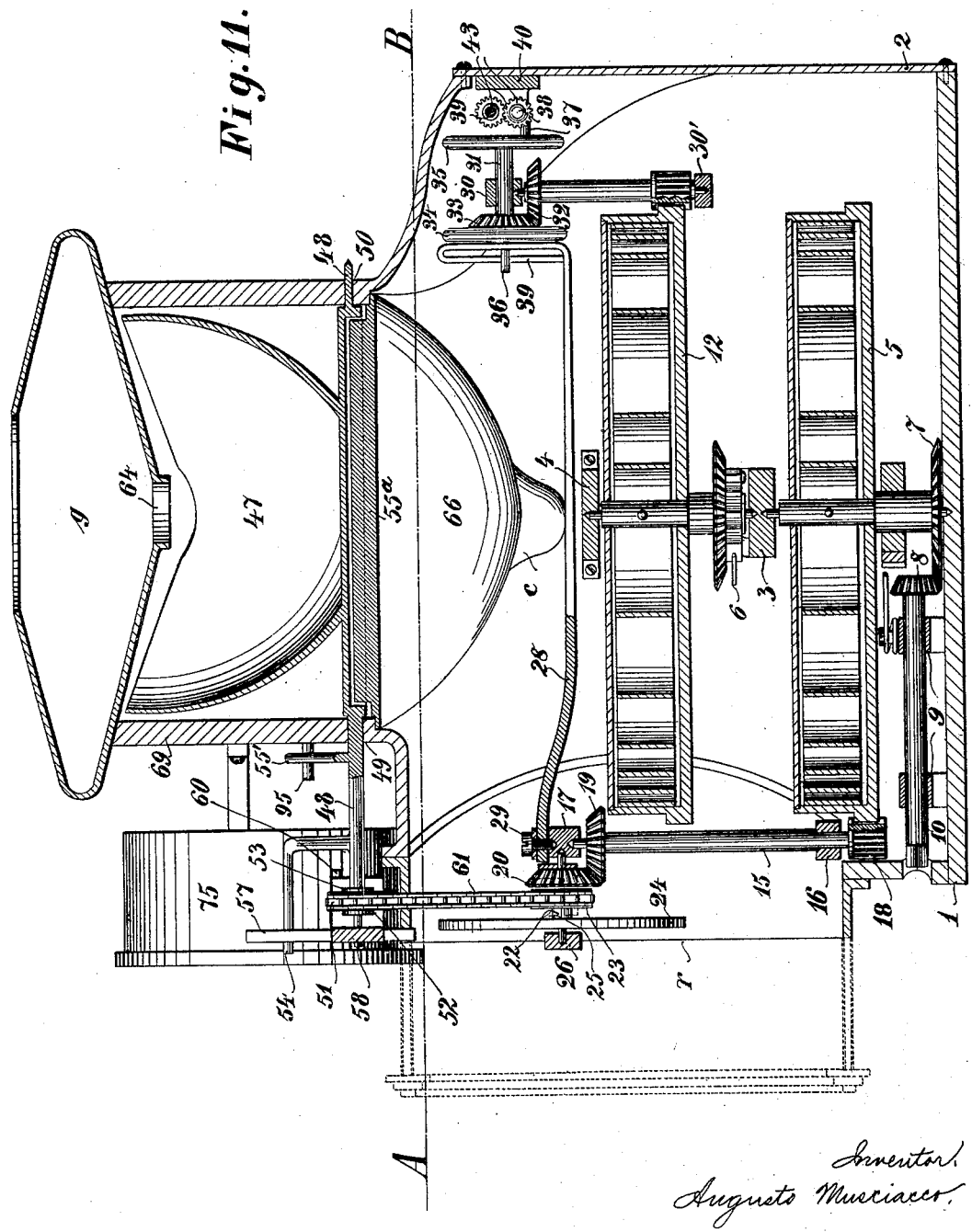

Figure 1 is an elevation, partly in section, the clockwork being omitted. Figs. 2 and 3 are horizontal sections on the lines A B and D E of Fig. 1, parts of the casing being removed to show the internal mechanism. Figs. 4 to 10 show details of the mechanism. Fig. 11 is a vertical longitudinal section, and Fig. 12 is a vertical cross-section, showing the drums and the parts driven thereby.

The bottom 1 of the apparatus is in the form of a disk provided with a backward extension. On the bottom 1 is mounted a wall 2, which carries rods 3 and 4. Beneath the rod 3 is located a drum 5, loose on its shaft, which contains a spring and is provided with a pawl 6. 7 is a bevel-wheel keyed on the shaft of the drum 5 and engaging with a bevel-wheel 8, carried by a shaft 10, mounted in bearings 9. This shaft 10 extends to the periphery of the bottom 1—*i. e.*, to and through the wall 2, where it is formed with a square, so as to carry a key, by rotating which from left to right the spring within the drum 5 can be wound up, the drum when the spring unwinds rotating in the direction of the arrow 11. Between the rods 3 and 4 is mounted another spring-drum 12, also loose on its shaft, arranged and driven through a square-ended shaft 13 and bevel-wheels, as is the drum 15. When the shaft 13 is rotated by means of a key from left to right the spring within the drum is wound up, the drum, as the spring unwinds, rotating in the direction of the arrow 14.

16 and 17 are bearings in which is mounted a vertical shaft 15, carrying at one end a pinion 18 and at the other end a bevel-wheel 19. The pinion 18 meshes with teeth on the exterior of the drum 5, and the bevel-wheel 19 with a bevel-wheel 20, Figs. 1 and 2, rotating it in the direction of the arrow 21. The bevel-wheel 20 is carried by a horizontal shaft, which also carries two other wheels 23 and 24, the last-mentioned wheel having only one tooth 25, Fig. 2. The shaft 22 is mounted in bearings 17 and 26, the bearings 26 being carried by a rod 27, attached to the edge *r* of the casing. It will be seen that the drum 5 thus rotates the wheel 24 and causes the tooth 25 thereon to engage with one arm of a fork on a rod 28, pivoted at 29. When the rod 28 is moved to its opposite position—for instance, the one shown in dotted lines in Fig. 2—the wheel 24 is rotated until it is stopped by the tooth 25 coming in contact with the other branch of the fork. The wheel 24 thus only rotates half a revolution for each movement of the rod 28.

30 is a horizontal carrier attached to the wall 2 and having mounted on it a horizontal shaft 31, that carries a bevel-wheel 33, meshing with a bevel-wheel 32, carried by a vertical shaft that is driven from the spring-drum 12 in a manner similar to the manner in which the wheel 19 is driven from the drum 5. The shaft 31 also has keyed to it two other wheels 34 and 35, each of which is provided with one tooth 36 37. The tooth 36 in the wheel 34, Fig. 6, works in a slot 39, formed on an upward extension of the rear end of the rod 28. When, therefore, the spring-drum 12 rotates, the rod 28 is moved from right to left and from left to right, the wheel 24 being thus allowed to rotate intermittently.

Figure 4:
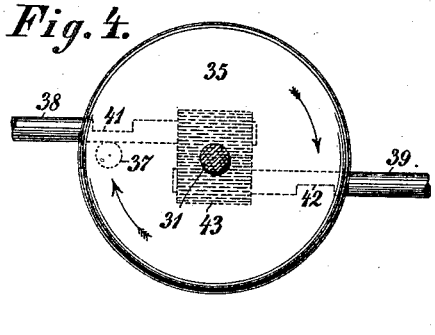
Figure 6:
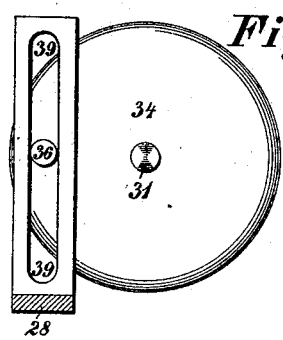

The tooth 37 on the wheel 35, Figs. 2 and 4, abuts against shafts 38 and 39 in such a manner that the wheel 35 can only be released by the tooth 37 passing through notches 41 and 42 on the shafts 38 and 39, which are mounted in bearings at 40 and are connected together by means of pinions 43, so that the notches 41 and 42 are always brought in front of the tooth 37 in the same manner and in such a way that they are alternately at the right or at the left.

The shafts 38 and 39 are rotated continuously through bevel-wheels 44 and 45 and shaft 46. The latter is driven by clockwork that is connected at the edge r. It follows, therefore, that the interruption during a half-revolution of the wheel 24 is quite uniform, since it depends on the movement of the clockwork.

Figure 5:
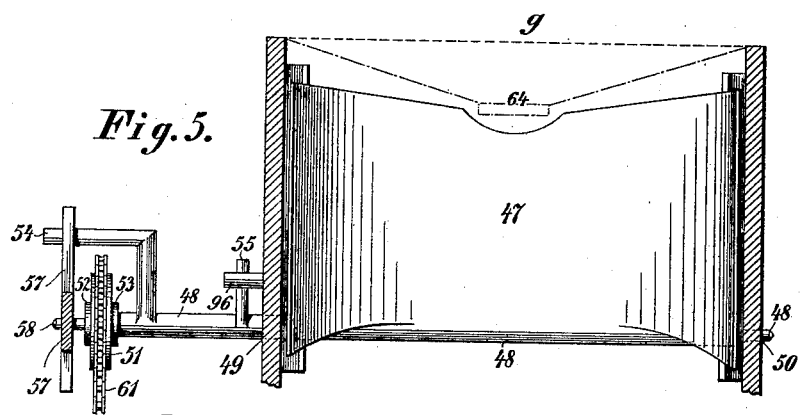

The wheel 23, Figs. 1 and 2, transmits, by means of a chain 61, its intermittent movement to a wheel 51, Figs. 1, 3, and 5, that is loosely mounted on a shaft 48 between collars 52 and 53 and carries a pin 58, Figs. 1 and 5, which works in a slot 56, Fig. 1, in a flat rod 57, Figs. 1, 3, and 5. This rod 57 is guided in bearings 59 and 60 and receives a movement to the right or to the left, according to the position of the pin 58.

The shaft 48 carries an arm 54, which engages in the slot 56 and transmits the movement of the shaft 48 to the distributer 47, which is rigidly fixed on the shaft 48.

55 is another extension on the shaft 48 and serves as an abutment for this shaft against stops 95 and 96. The distributer 47 is shown in plan in Fig. 3 and in elevation in Fig. 5 and in side elevation corresponding to its two outer positions in Fig. 1 by dotted lines.

It will be most clearly seen at 62 and 63, Fig. 1, that the liquid issuing from the opening 64 flows, according to the position of the distributer, either through the compartments 68 or 69 in the direction indicated by the arrows toward the outlets 70 and 71.

Figure 7:
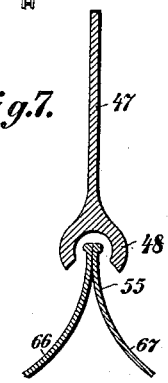

Fig. 7, which is a vertical section through the distributer 47, shows the manner in which it is connected with the shaft 48, which is hollow, so as to cover the junction 55ª of the walls 66 and 67 of the chambers 68 and 69.

Instead of the driving mechanism herein described for effecting the movement, particularly of the spring-drums 5 and 12, and for transmitting the movement therefrom any other suitable mechanism can of course be used.

The duration of the interruption of the movement of the distributer 47 is determined by the pinions 44 and 45, which can be replaced by other pinions of different relative sizes, and thereby the duration of the interruption varied accordingly.

Figure 8:
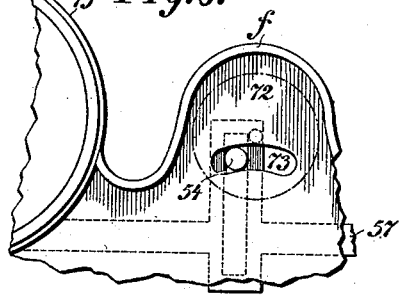
Figure 9:
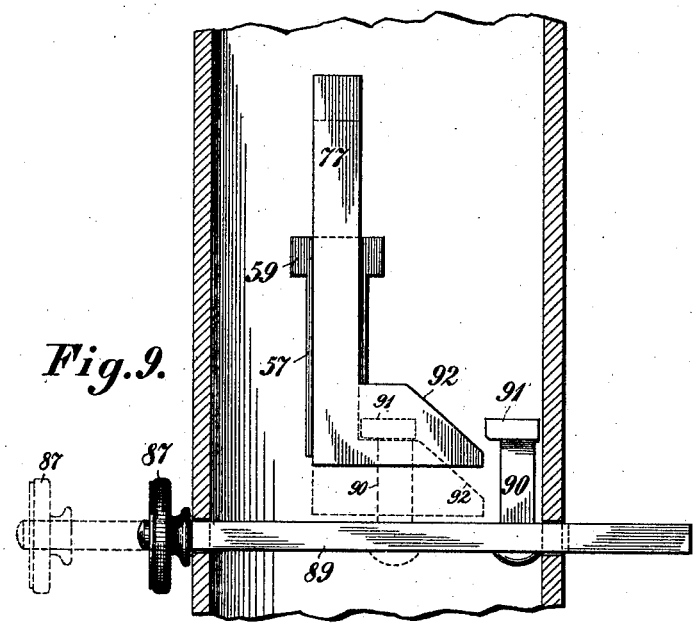
Figure 10:
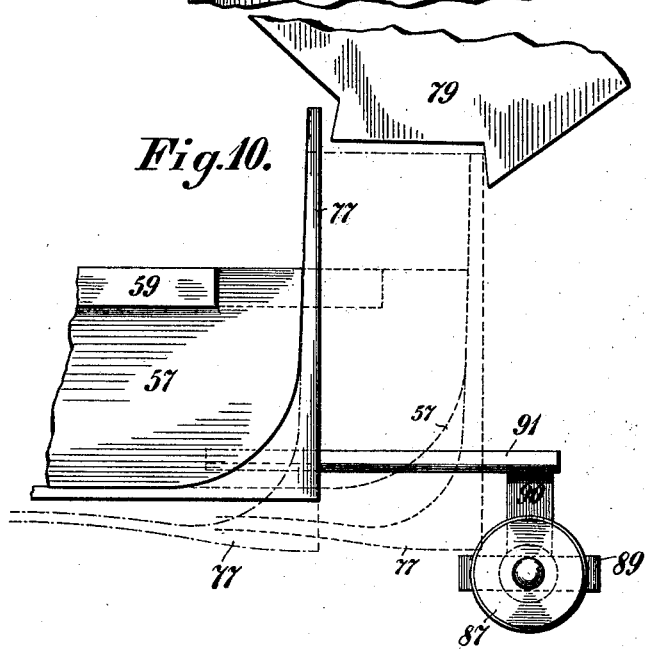

On the front edge of a sleeve f, Figs. 8 and 1, is formed a slot 73, in which engages the arm 54, the end of which in passing strikes the hammer of a bell 72, and thus gives a signal.

On the front of the apparatus are placed dials 75 and 76, which indicate the quantities of liquid drawn from the outlets 70 and 71.

Both of the ends of rod 57 act on the pointers of the dials, according to the positions of the rod 57, in such a way that the positions of the pointers correspond at any time to the positions of the distributer, so that the quantities of liquid withdrawn can be accurately determined. The end of the rod 57 carries a spring 77, attached by a screw at 78. As often as the rod 57 is moved it engages a tooth of a wheel 79; but this wheel cannot turn, because of the pawl 80, until the rod 57 is drawn back. Concentrically with the wheel 79 is arranged a toothed wheel 81, which transmits movement to one or more pointers or indicators in such a way that these pointers or indicators rotate at each movement of the rod 57—i. e., corresponding to the quantities of liquid withdrawn. By means of a knob 87 a person is enabled to render this counting device inoperative by pulling out the knob 87, which is connected with a bolt 90, carrying a lock 91, Fig. 10, which pulls down the spring 77 by pressing on the incline 92, Figs. 9 and 10.

Having now particularly described and ascertained the nature of this invention and in what manner the same is to be performed, I declare that what I claim is—

1. In a device of the class described, means for laterally guiding a liquid, a vertical vibrating distributer at the junction thereof, means for vibrating the distributer, a horizontal vibrating rod beneath the distributer to control the latter and time-controlled means to control the vibration of said rod, substantially as described.

2. In a device of the class described, means for laterally guiding a liquid, a vibrating distributer at the junction thereof, a spring-propelled drum to vibrate the distributer, a vibrating rod to control the driving of said distributer and rotating time-controlled mechanism to control the vibrations of said rod, substantially as described.

3. In a device of the class described, means for laterally guiding a liquid, a vibrating distributer, a spring-driven drum, a shaft driven by said drum, a stop-wheel and its shaft driven therefrom, a distributer vibrated from the stop-wheel and shaft, a vibrating arm to control the movement of said stop-wheel and shaft, a second spring-driven drum, mechanism driven thereby to vibrate said rod and time-controlled means to determine the vibration of the rod, substantially as described.

4. In a device of the class described, two compartments in juxtaposition, a distributer and its shaft at the junction; a spring-driven drum, a stop-wheel and shaft driven from said drum, a slide having a slot, means for reciprocating the slide from said stop-wheel shaft, a pin on the distributer-shaft taking into the slot, whereby the distributer is vibrated and time-controlled means engaging the cam-wheel to control the revolution of it and its shaft, substantially as described.

5. In a device of the class described, two compartments in juxtaposition, a shaft having a recess fitting over the junction of said compartments, a spring-driven drum, a stop-wheel and shaft driven from said drum and arranged to drive the distributer-shaft, a slide having a slot therein, said pin taking into the slot, a registering mechanism operated by the slide, and an arm engaging the stop-wheel and means time-controlled to control the movement of said lever, substantially as described.

6. In a device of the class described, two compartments in juxtaposition, a shaft having a recess fitting over the junction of said compartments, a distributer, a stop-pin and an actuating-pin on said shaft, a spring-driven drum, a vertical shaft, a stop-wheel, its shaft and a sprocket-wheel thereon driven from the vertical shaft, means for driving the distributer-shaft from said sprocket-wheel, a pivoted arm arranged to engage the stop-wheel, a second drum, a driving-wheel having a single tooth, its shaft and a second stop-wheel thereon driven from the second drum, a pair of shafts geared together and having notches and time-driven, the rotation of said second stop-wheel controlled by said notched shaft, substantially as described.

7. In combination, means for guiding a substance to be measured, a vibrating distributer, a driven drum, a shaft driven thereby, a stop-wheel and its shaft driven from the drum, an arm, a second driven drum to vibrate said arm to control the stop-wheel and time-controlled means to determine the times of vibration of said arm, substantially as described.

In testimony that I claim the foregoing as my invention I have signed my name in presence of two subscribing witnesses.

AUGUSTO MUSCIACCO.

Witnesses:
WOLDEMAR HAUPT,
HENRY HASPER.